Dec. 31, 1957 J. A. DE SHONG, JR 2,818,504

LOGARITHMIC AMPLIFIER

Filed Sept. 13, 1954 2 Sheets-Sheet 1

INVENTOR.
James A. DeShong, Jr.

BY Roland A. Anderson

ATTORNEY

Dec. 31, 1957 J. A. DE SHONG, JR 2,818,504

LOGARITHMIC AMPLIFIER

Filed Sept. 13, 1954 2 Sheets-Sheet 2

INVENTOR.
James A. DeShong, Jr.
BY
Roland A. Anderson
ATTORNEY

United States Patent Office 2,818,504

Patented Dec. 31, 1957

2,818,504

LOGARITHMIC AMPLIFIER

James A. De Shong, Jr., Elmhurst, Ill., assignor to the United States of America as represented by the United States Atomic Energy Commission Application September 13, 1954, Serial No. 455,806

4 Claims. (Cl. 250—27)

This invention relates to amplifier circuits and in particular to logarithmic current amplifier circuits having a high sensitivity and fast response.

The use of logarithmic amplifiers to measure small currents over a very wide range is well known. Probably the widest application of instruments having logarithmic response is in the measurement of quantities that vary over wide ranges, for example, antenna signal strengths which might vary by a factor of $10^6$, or sound pressures which might vary by a factor of $10^3$, or radioactive radiation intensities which might vary by a factor of $10^8$. Logarithmic current amplifiers have been widely used in the nuclear field for measuring neutron flux detector current over wide ranges ($10^8$) of reactor operation.

A well known method of obtaining the logarithmic characteristics is through the use of a hard vacuum diode which has an output voltage proportional to the log of the input current, said diode operated with a negative potential on its plate electrode. For example, in radiation intensity studies, an ionization chamber is usually connected in series with a load, such as a diode and a source of potential, said diode being coupled to an amplifier for amplifying the current variations to proper magnitudes for further use. The use of an ionization chamber with a diode load having a high input resistance results in a high response time for the entire circuit. As is well known in the art, the time required for such a circuit to respond to a rapid change in conditions under measurement is dependent on the product of the value of capacitance of the chamber and the value of the series resistance, this product being known as the "time constant" of the system. The use of negative feedback amplifiers for the time constant reduction is a well known technique where all time constants involved are fixed and independent of amplitude. In the case of a system utilizing a feedback amplifier, an ionization chamber, and a diode, the time constant of the input circuit is inversely proportional to input current and becomes equal to the amplifier's forward gain time constant at some current level unless the amplifier has an extremely wide pass band. Whenever the time constant of the input circuit becomes equal to the amplifier's forward gain time constant, the amplifier becomes unstable in amplification of signals in the upper frequency range as will be discussed hereinafter. The regular feedback amplifier is therefore limited to low input capacity or restricted current range with larger input capacity.

An object of this invention is to provide a current feedback amplifier with a diode input circuit, said amplifier having a fast response even though the input into the diode input comprises currents varying over a wide range.

Another object of the invention is to provide means for reducing the forward gain at higher frequencies in a feedback amplifier at a rate at which the forward phase shift of the amplifier does not exceed 45° until the gain is reduced to unity or less.

Another object of the invention is to provide means for reducing the forward gain of an amplifier at a controlled rate, which means in conjunction with a feedback arrangement will reduce the time response of the logarithmic amplifier.

Other objects and advantages of this invention will become more apparent from a study of the following description taken in conjunction with the accompanying drawing comprising several figures, wherein.

Figure 1:
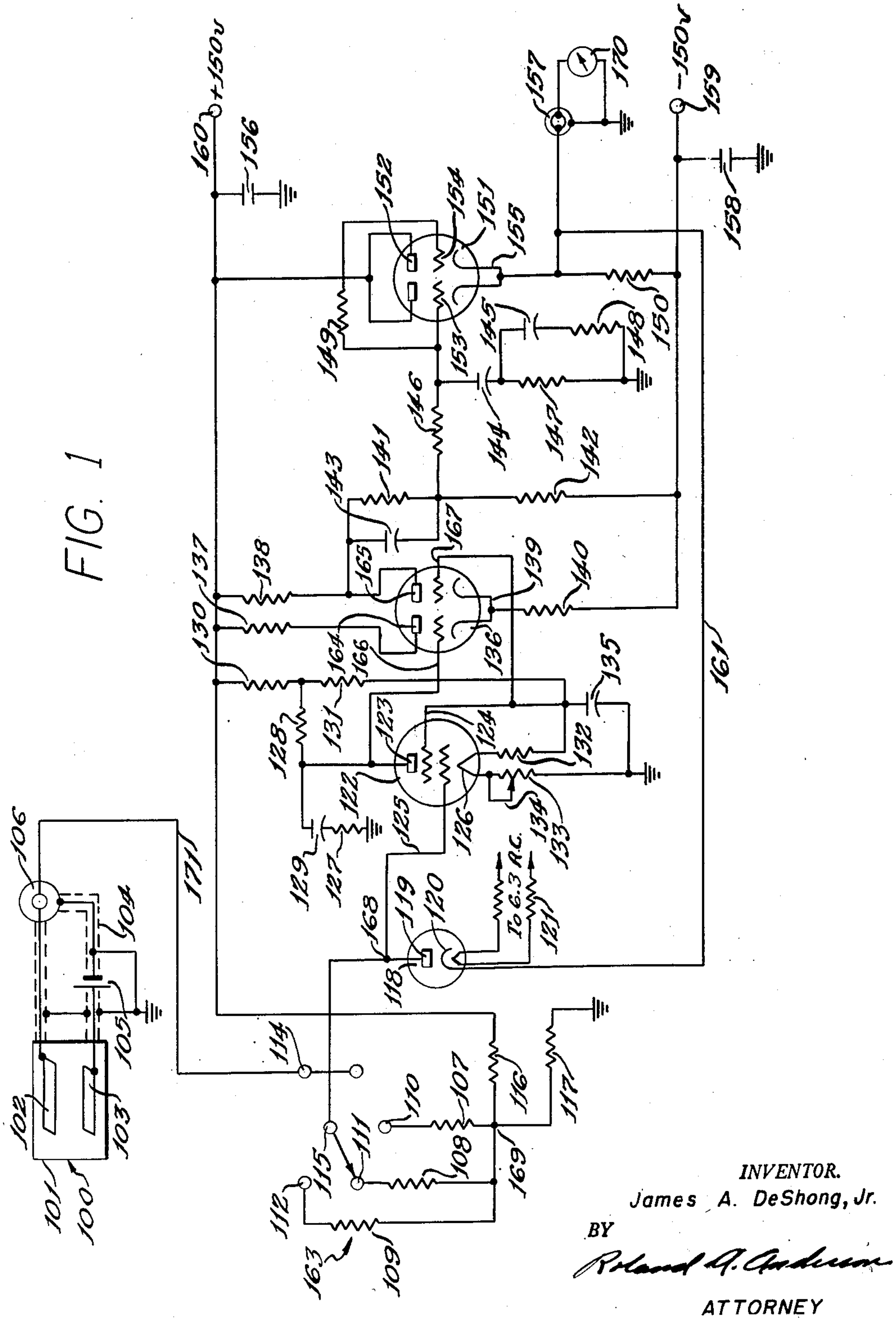
Figure 1 represents a circuit diagram of a logarithmic current feedback amplifier for use with inputs having a wide range of current magnitudes.

Referring to Figure 1, an ionization chamber 100 comprises a receptacle 101 containing therein a pair of electrode plates 102 and 103. The plate 102 is connected by means of a lead to an inner terminal of a plug 106, while the plate 103 is connected through a battery 105 to an outer terminal of the plug 106. Both of the leads connecting the plates 102 and 103 to the plug 106 are shielded by means of a suitable shield 104.

A calibrator network 163 comprises a switch 115 having a movable arm operable upon a series of contacts 110—114. The contact 114 is connected by a suitable lead to the inner terminal of the plug 106. The contacts 110—112 are connected through resistors 107—109, respectively, in series with a common resistor 117 to ground.

The input to the logarithmic amplifier comprises a diode tube 118 having a plate 119 connected to the movable arm of the switch 115 and a cathode 120 connected by means of a lead 161 to obtain feedback voltage signals from another part of the logarithmic amplifier as will be described hereinafter. Filament voltage is supplied to the diode tube 118 from a suitable source (not shown) through a pair of resistors 121. The resistors 121 act as voltage dropping resistors to maintain the proper filament voltage in the tube 118.

The next stage that follows the diode input stage of the logarithmic amplifier comprises an amplifier stage which has an amplifier tube 122 having a grid 125 connected by a lead to the plate 119 of the diode 118. A plate 123 of the tube 122 is connected through resistors 128 and 130 to a source of postive voltage supply available at a terminal 160. The plate 123 is also connected through a capacitor 129 in series with a resistor 127 to ground. The tube 122 is a conventional electrometer type tube characterized by a very high input impedance. A voltage divider network comprising resistors 130, 131, 132, filament 126, and 133 is connected across the source of positive supply available at the terminal 160 to ground. A screen grid 124 of the tube 122 is connected to the junction of the resistors 131 and 132 to obtain proper operating voltage therefor. This junction point is bypassed to ground by means of a capacitor 135. The filament 126 of the tube 122 obtains the proper voltage and current from the voltage divider network described hereinbefore. The resistor 133 has an adjustable tap 134 for adjusting the cathode voltage to a proper setting during calibration of the calibrator network, the calibration to be described hereinafter.

The next stage is an amplifier-inverter stage which utilizes a duplex triode tube 136 having a pair of plates 164 and 165 connected through a pair of resistors 137 and 138, respectively, to a source of positive voltage supply available at the terminal 160. A grid 166, which serves as the input into the tube 136, is connected to the plate 123 of the tube 122 in the preceding stage. The other grid 167 is connected to the screen grid 124 of the tube 122. Both of the cathodes 139 are tied together and connected through a cathode resistor 140 to a source of negative voltage supply available at a terminal 159. A capacitor 158 by-passes the terminal 159 to ground, and a capacitor 156 by-passes the terminal 160 to ground. The plate 165 is also connected to the source of negative voltage supply available at the terminal 159 via a resistor 141 connected in series with a resistor 142. A capacitor 143 shunts the resistor 141.

The last stage of the logarithmic amplifier is a cathode-follower stage comprising a tube 151 which is a duplex triode. The tube 151 has both of its plates 152 tied together and connected directly to the source of positive voltage supply present at the terminal 160. The output of the previous inverter stage is fed from the junction of the resistors 141 and 142 through a resistor 146 onto the grid 153 of the tube 151. The other grid of the tube 151, namely grid 154, is connected by means of a resistor 149 to the grid 153. The cathodes 155 are tied together and connected through a resistor 150 to the source of negative voltage supply present at the terminal 159. The grid 153 is connected through a capacitor 144 and the resistor 147 to ground. A shunting network comprising a capacitor 145 connected in series with the resistor 148 is connected to the junction of the capacitor 144 and the resistor 147 and to ground. The output of the logarithmic amplifier is removed at the junction point of the cathodes 155 and the resistor 150 and connected to an output plug 157. A feedback voltage is also removed from the junction of the resistor 150 and the cathodes 155 and connected via the lead 161 to the cathode 120 of the diode tube 118. The filaments of the tubes 136 and 151, which are not shown in Figure 1, are energized by a conventional power supply.

The resistor 133 is a potentiometer with an adjustable tap 134 which is used for the adjustment of voltage on the cathode of the tube 122. The capacitors 156 and 158 are by-pass capacitors for filtering the output of a power supply (not shown) to the terminals 160 and 159, respectively. One set of values of the components for the embodiment under present consideration will be given later. When these circuit values are used, the tube 122 serves as an amplifier and has a gain of approximately 10 to 20 and the tube 136 serves as a gain-phase inverter and has a gain of about 30. The tube 151 is a cathode-follower supplying a source of current to be removed at the output terminal 157. During the full conduction of the tube 151, the amount of current flowing through the resistor 150 is fairly large. A special impedance network comprising the resistors 127 and 128 and the capacitor 129, a special network comprising the resistors 146 and 147 together with the capacitor 144, and a special network comprising the resistor 148 and the capacitor 145 are used for attenuating signals in different areas of the frequency range. It will be noticed that the electrodes in the tube 151, which have a similar purpose, are connected together except wherein the grids are concerned. The grid 154 is connected through a resistor 149 to the grid 153. The resistor 149 is used to prevent parasitic oscillations which may be caused by dynatron action. The dynatron action can be attributed to the inherent capacitance and inductance existing in the electrodes contained within the tube 151 and the components associated with said electrodes in this circuit. Since these inherent circuit components are responsible for parasitic oscillations, the use of the resistor 149 prevents the tube 151 from breaking into periodic oscillations.

The diode tube 118 is used as a variable impedance in the input circuit of the logarithmic amplifier. A unity feedback circuit transmits a voltage over the lead 161 so that the plate 119 of the tube 118 is kept very close to ground potential thereby presenting a low time constant to the charging currents transmitted by the ion chamber 100.

Figure 2:
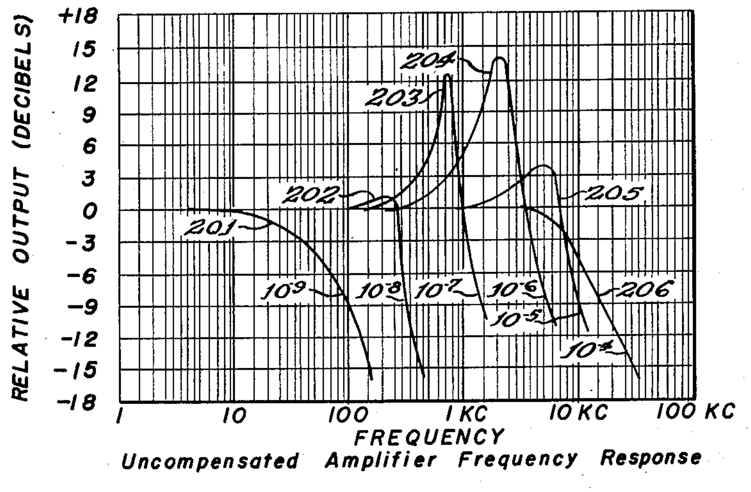
Figure 2 represents a series of frequency response curves for a logarithmic current feedback amplifier not utilizing compensating networks which comprise the subject of this invention.

Referring to Figure 2, a series of curves representing the frequency response characteristics of an uncompensated logarithmic amplifier, having a feedback loop, are shown for different values of current transmitted through the diode 118 found in the input side of the amplifier. An uncompensated logarithmic amplifier with a feedback loop comprises the usual components found in the circuit indicated in Figure 1 with the exception of the special impedance networks which have been incorporated therein to attenuate the higher frequencies amplified by the logarithmic amplifier circuit. The circuit structure of an uncompensated amplifier will be described later in detail. The special networks are those which contain the resistors 127, 128 together with the capacitor 129; the resistors 146, 147 together with the capacitor 144; and the resistor 148 together with the capacitor 145.

Figure 3:
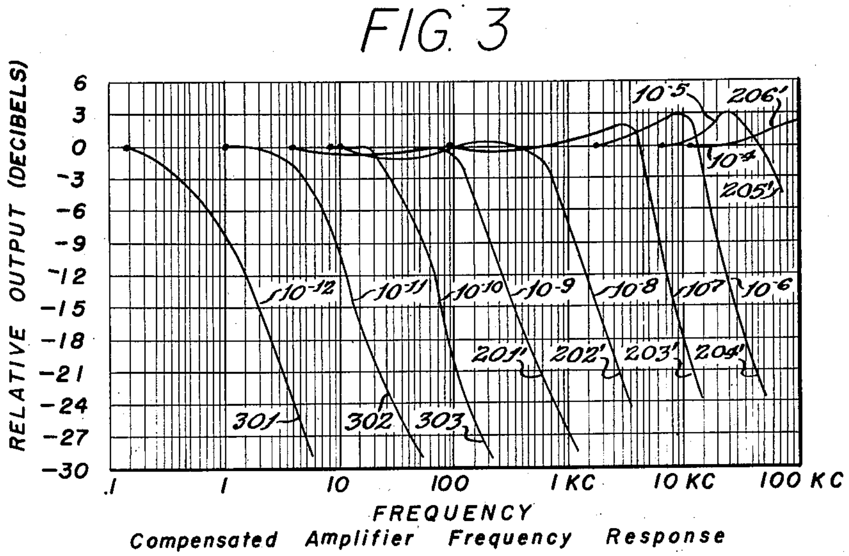
Figure 3 represents a series of frequency response curves for a logarithmic current feedback amplifier utilizing compensating networks which are the subject of this invention.

Figure 3 represents a series of frequency response curves for a logarithmic feedback amplifier compensated by the special networks as shown in Figure 1. The curves, as shown in Figure 3, represent different magnitudes of current flowing through the diode tube 118 in the input of the logarithmic amplifier.

As was stated before, the logarithmic current characteristics can be easily obtained by the use of a hard vacuum diode tube whose output voltage may be made proportional to the log of the input current. Unfortunately, the diode resistance is approximately equal to the reciprocal of ten times the input current. This relation holds true for most hard vacuum diode tubes. Thus, for an input of $10^{-12}$ ampere the resistance would be $10^{11}$ ohms. When the input circuit consists of an ion chamber and a connecting coaxial cable, the input capacity frequently is of the order of $10^{-9}$ farad or more. The dynamic resistance of the ion chamber or other input device must, of course, be at least $10^2$ times higher in resistance than the diode resistance so that it may function as a current source. When this condition is met, the time constant of the input circuit becomes simply the diode resistance times the input circuit capacity. For the case of the ion chamber and a current of $10^{-12}$ ampere the time constant is ($10^{11}$ ohms times $10^{-9}$ farad) 100 seconds. This long time constant renders the information useless in this range of current for most purposes unless an arrangement like that described in this invention is used. Continuing further on the basis that the diode resistance is approximately equal to the reciprocal of ten times the input current, for an input current of $10^{-4}$ ampere the resistance would be $10^3$ ohms. The input time constant for the ion chamber would then be $10^3$ times $10^{-9}$ or one microsecond at the highest current level of $10^{-4}$ ampere. So for the current range of $10^{-4}$ to $10^{-12}$ ampere, the input time constant varies from one microsecond to 100 seconds. The input circuit, which comprises the ionization chamber, the coaxial cable and the diode, possesses an input time constant which combines with the inherent time constant of the amplifier itself, as mentioned hereinbefore, to produce instability at certain current levels when feedback is used. The variable currents in the input circuit produce a phase shift which combines with the inherent phase shift of the amplifier circuit alone to produce a phase shift greater than 90°. A phase shift greater than 90° introduces a regenerative signal in the feedback loop of the amplifier to make its operation unstable. The impedance networks, described in this invention, are used in conjunction with the negative feedback circuit of the logarithmic current amplifier to reduce the forward gain thereof at the higher frequencies in a particular manner. This particular manner consists of holding the forward gain phase shift of the amplifier alone to within a 45° limitation as will be described hereinafter.

The manner in which the forward gain is reduced in the logarithmic amplifier is dictated by feedback amplifier criteria which show that the reduction must take place in such a manner that the forward gain phase shift of the amplifier never exceeds 45° until the gain is reduced to unity or less. The Figures 2 and 3, which graphically illustrate the frequency response characteristics of both uncompensated and compensated logarithmic amplifiers (as described hereinafter) for various current inputs, are used for the purpose of evaluating qualitatively and quantitatively the response of the amplifier circuits in a particular frequency range.

In Figure 2, a series of frequency response curves are shown plotted for a group of base currents ranging from $10^{-9}$ to $10^{-4}$ ampere as indicated by the reference numerals 201—206. These curves have been plotted for a logarithmic negative feedback amplifier not utilizing the compensating impedance networks as were described hereinbefore. The uncompensated amplifier would have the same circuit structure as the compensated amplifier shown in Figure 1 with the following exceptions: The resistors 127, 128 and the capacitor 129 (comprising one compensating network) are left off entirely so that the plate 123 connects (without being shunted) through the resistor 130 to the source of positive potential available at the terminal 160; the resistors 146, 147 and 148 together with the capacitors 144 and 145 (comprising the other two networks) are left off so that the grid 153 is connected directly to the junction of resistors 141 and 142.

Everything else in the circuit remains the same to form the uncompensated amplifier. The curves 203—205 indicate that the uncompensated amplifier is unstable in a particular frequency range for certain current magnitudes appearing at the input to the amplifier. This instability may assume any of the common forms such as continuous oscillation, damped oscillation, or other intermittent transient variations in amplitude and phase.

The use of corrective impedance networks with a feedback circuit greatly improves the frequency response of a logarithmic feedback amplifier, for the set of values to be given later, as is obviously evident from Figure 3. The frequency response curves for a logarithmic feedback amplifier utilizing the impedance networks are shown by the reference numbers 301—303 and 201′—206′, representing the current magnitudes $10^{-12}$ to $10^{-4}$ ampere fed into the input of the amplifier. The increase in gain above the desired reference level of the curves 203′ to 205′ of a compensated amplifier is relatively small when compared to the gain variation excesses shown by similar curves 203 to 205 associated with a current input of $10^{-7}$–$10^{-5}$ ampere of an uncompensated amplifier.

In normal feedback amplifier design where all time constants are independent of amplitude, it is necessary only that a phase margin of 45° exist where the gain passes through unity. The logarithmic amplifier input time constant, which varies with the input currents, has the effect of moving the unity gain point over a frequency range corresponding to the range of the input current variation, thus preventing the use of single point compensation as can be done in normal feedback amplifiers. Therefore it is clear that the forward phase shift of the amplifier may not exceed 45° at any frequency below the unity gain frequency if optimum transient performance is to be obtained for all current levels. For detailed discussion on feedback amplifiers reference may be had to "Network Analysis and Feedback Amplifier Design" by H. W. Bode.

The forward phase shift of any amplifier is proportional to the slope of its amplitude versus frequency curve. In order not to exceed the specified 45° phase shift in the case of a compensated amplifier with feedback, it is necessary that the slope of the forward gain characteristic not exceed a 0.7 (3 db) reduction in amplitude for every two times increase in frequency. The amplifier unity gain frequency ($f_1$) must be set to one-half to one-fifth of the frequency for which the inherent forward phase shift of the amplifier (without correction) is 45°. From this point downward, the amplitude versus frequency curve must not be allowed to rise at a rate exceeding 1.4 times for every two times reduction in frequency. In a design of a compensated feedback amplifier, it is necessary to select the proper tubes and other components so that sufficient amplification may be achieved. Since feedback is obtained at the expense of gain, provisions must be made to achieve sufficient gain. Unity feedback is maintained so that the output voltage is substantially equal to the diode voltage. The forward D. C. voltage gain, $A_0$, required in the circuit, is set by the unity gain point, the slope required for a 45° phase shift, and the input time constant at the lowest current which the circuit is designed to receive. For example, in the case already cited wherein the input impedance comprises a resistance of $10^{11}$ ohms associated with a capacitance of $10^{-9}$ farad, a time constant of ($10^{11}\times10^{-9}$) 100 seconds was calculated for a current of $10^{-12}$ ampere. The D. C. gain can be calculated from the following equation:

$$A_0=(2\pi f_1 RC)^{1/3}$$
$$=(200\pi f_1)^{1/3} \text{ for } 10^{-12} \text{ ampere}$$

As is evident from the above equation, the D. C. gain varies directly with the cube root of the input time constant (RC).

The frequency, $f_2$, where the downward slope starts, may be determined by the following equation:

$$f_2=f_1/A_0^2$$

The logarithmic feedback amplifier circuit shown in Figure 1 uses resistor-capacitor combinations to produce a satisfactory approximation to the above-specified mathematical expressions. These resistor-capacitor combinations, which have been disclosed hereinbefore, comprise resistors and capacitors which are repeated again to indicate their use in the circuit; resistors 127, 128, 146, 147 and 148 together with the capacitors 129, 144 and 145. The circuit gain for the circuit (the components comprising said circuit to be given hereinafter) illustrated in Figure 1 is 300 and the value of $f_2$ is one cycle per second. The amplitude versus frequency curve for the compensated feedback amplifier of Figure 1 is shown in Figure 3.

A comparison of Figures 2 and 3 will show how effective the use of the compensating networks is in a feedback amplifier circuit in achieving attenuation in the upper frequency range to bring about circuit stability. Using the zero reading as a reference level in both graphs and considering said level as a gain of unity, the over-all performance of the compensated circuit has peak magnitudes of about 1.4 times (Figure 3) the reference level as compared to the peak magnitudes of about six times the reference level for the uncompensated case (Figure 2). In terms of circuit damping factor, frequently used for step response evaluation, the uncompensated case has a damping factor of only 0.09 whereas the compensated case has a damping factor of 0.4. This means that a maximum overshoot of about 76% will occur in the uncompensated case for $I=10^{-6}$ ampere whereas the overshoot in the compensated case is only 25% for the same current.

The results accomplished by the addition of feedback and the corrective impedance networks to a regular logarithmic amplifier are readily seen in the table below, wherein the time constant is shown for various current magnitudes which are fed into the input of an amplifier first with compensated feedback and then without feedback.

| Input current (amperes) | Time constant (seconds) | |
|---|---|---|
| | Without feedback | With feedback |
| $10^{-12}$ | $10^{2}$ | $0.0043\times10^{2}$ |
| $10^{-11}$ | $10^{1}$ | $0.0035\times10^{1}$ |
| $10^{-10}$ | $10^{0}$ | $0.0053\times10$ |
| $10^{-9}$ | $10^{-1}$ | $0.011\times10^{-1}$ |
| $10^{-8}$ | $10^{-2}$ | $0.023\times10^{-2}$ |
| $10^{-7}$ | $10^{-3}$ | $0.032\times10^{-3}$ |
| $10^{-6}$ | $10^{-4}$ | $0.094\times10^{-4}$ |
| $10^{-5}$ | $10^{-5}$ | $0.28\times10^{-5}$ |

The calibrator circuit 163 is used for the purpose of calibrating the logarithmic amplifier circuit according to the input current passed through the diode tube 118. The magnitudes of the currents associated with the various resistors comprising the calibrator circuit 163 are indicated below for the various calibrator settings:

| Calibrator position | Current (I) |
|---|---|
| 110 | $10^{-4}$ |
| 111 | $10^{-8}$ |
| 112 | $10^{-12}$ |

The resistors 116 and 117, as shown in the circuit diagram, are connected across a positive source of voltage of 150 volts to ground so that a voltage of ten volts exists at the junction point 169. This voltage present at the junction point 169 is used to drive a current of a certain magnitude as determined by the individual resistors associated with the calibrator position. For example, with the arm of the switch 115 in the 112 position, a current of $10^{-12}$ ampere will flow through the circuit. The voltmeter 170 connected to the output 157 may be adjusted to zero deflection corresponding to $10^{-12}$ ampere by means of a rheostat 133.

The flow of electrons over the circuit, described hereinbefore, and through the diode tube 118 causes a certain voltage to exist at the junction point 168. This voltage is in turn impressed upon the grid 125 of the tube 122. The voltage impressed upon the grid 125 controls the amount of conduction in the tube 122. The voltage variation on the plate 123 of the tube 122 is impressed upon the grid 166 of the tube 136. The voltage variations of the grid 166 vary the conduction of the tube 136 so that an amplification of about 30 is obtained in the left-hand triode. The right side of the duplex triode 136 is used mainly for the purpose of signal inversion so that a signal of proper polarity may be obtained in a subsequent stage so that it can be used for feedback purposes. The conduction in the tube 136, which is essentially controlled by the signals on the grid 166, affects the current flow through the cathode resistor 140 so that a voltage variation exists on the cathode 139, especially the right-hand cathode. The voltage variations, therefore, on the plate 165 are in an opposite phase to those found on the plate 164. These voltage variations on the plate 165 are coupled by suitable means to the grid 153 of the cathode follower tube 151. Although the tube 151 is a duplex triode, it is operated as a single tube allowing thereby a heavy draw of current therethrough. A portion of the current available at the junction of the cathodes 155 of the resistor 150 is transmitted over lead 161 to the cathode 120 of the diode tube 118. The function of the feedback current fed to the cathode 120 is to reduce the effect of the input capacity existing in the tube 118 and the surrounding associated circuits. Whenever the voltage on the plate 119 of the tube 118 increases because of a larger current flowing through the tube 118, the polarity of the voltage resulting from the current fed back to the cathode 120 is similarly increasing so that the voltage existing on the plate 119 with respect to ground remains essentially near the ground level.

The values of the various components used in the logarithmic feedback amplifier are set out below:

Tubes:

| | |
|---|---|
| 118 | 9004 |
| 122 | CK571AX |
| 136 | 12AX7 |
| 151 | 12BH7 |

Resistors:

| | | |
|---|---|---|
| 107 | ohms | $10^5$ |
| 108 | do | $10^9$ |
| 109 | do | $10^{13}$ |
| 116 | do | 15K |
| 117 | do | 1070 |
| 127 | do | 108K |
| 128 | do | 0.5M |
| 130 | do | 11K |
| 131 | do | 2.5K |
| 132 | do | 1.0K |
| 133 | do | 500 |
| 137 | do | 100K |
| 138 | do | 100K |
| 140 | do | 150K |
| 141 | do | 1.0M |
| 142 | do | 1.8M |
| 146 | do | 0.6M |
| 147 | do | 130K |
| 148 | do | 36K |
| 149 | do | 100 |
| 150 | do | 3750 |

Capacitors:

| | | |
|---|---|---|
| 129 | mf | 0.2 |
| 135 | mf | 8 |
| 143 | mf | 0.25 |
| 144 | mf | 0.005 |
| 145 | mmf | 675 |
| 156 | mf | 0.01 |
| 158 | mf | 0.01 |

While there has been described what is at present considered to be the preferred embodiment of the invention, it will be understood that various modifications may be made therein and it is intended in the appended claims to cover all such modifications as found within the true spirit and scope of the invention.

What is claimed is:

1. In a logarithmic feedback amplifier for amplifying input signals varying in magnitude over a wide range, the variation in signal magnitude affecting the time constant of the amplifier, said amplifier comprising a diode input, a high input impedance amplifier stage coupled to said diode, said amplifier stage having an output, a source of potential having positive and negative terminals, a gain-inverter stage coupled to the output of the amplifier stage for amplifying and inverting the output of said amplifier stage, an output current stage having an input connected to the gain-inverter stage, all of said stages being connected across the terminals of the source of potential, the improvement wherein one impedance network having a low frequency response characteristic in the low frequency range is connected across the amplifier stage, a second impedance network having a low frequency response characteristic in the intermediate frequency range is connected across the output of the gain-inverter stage, a third impedance network having a low frequency response characteristic in the high frequency range is coupled to the second network, said networks being constructed and arranged to change the amplification of the individual stages as a function of frequency at a rate at which the phase shift does not exceed 45° at any frequency at which all the stages possess a gain greater than unity, and means for feeding a portion of the current from the output current stage to the diode in the input stage in phase opposition to the input signals to reduce frequency distortion, the impedance networks cooperating together with said feedback means to substantially decrease the time constant of the amplifier circuit resulting thereby in a fast response.

2. The amplifier as claimed in claim 1, wherein said impedance networks comprise a plurality of resistor and capacitor combinations, said combinations cumulatively effective to reduce the forward phase shift at the rate corresponding to a reduction of 0.7 in amplitude obtained for every two-time increase in frequency.

3. The device as claimed in claim 1, wherein the first impedance network comprises a resistor and a capacitor coupling the amplifier stage to the negative terminal and another resistor connecting said stage to the positive terminal of the source of potential, the second impedance network comprising a series connection of two resistors and a capacitor connected across the output of the grain-inverter stage to attenuate said output, and the third impedance network comprising a series connection of a resistor and a capacitor connected across one of the resistors in the second network to attenuate the output in the high frequency range, said plurality of impedance networks constructed and arranged to change the amplitude in the individual stages in a predetermined manner for every octave increase in frequency.

4. A logarithmic amplifier for amplifying input signals varying in current magnitudes, comprising an input signal source connected to a diode input of the amplifier, said input source presenting different input time constants to the amplifier due to the current variations, an amplifier stage connected to the diode input, a gain-inverter stage coupled to the amplifier stage for amplifying and inverting the signals, a cathode-follower stage coupled to the gain-inverter stage to provide a current output, a circuit connecting the cathode-follower stage to the diode input to feed back a portion of the output to reduce the input time constants, an impedance network having a low frequency response characteristic in the low frequency range is connected across the amplifier stage, an impedance network having a low frequency response characteristic in the intermediate frequency range is connected across the output of the gain-inverter stage, and a final impedance network having a low frequency response characteristic in the high frequency range is coupled to the second network, said networks cooperatively engaged with the feedback circuit to change the forward gain of the amplifier at a rate of 0.7 of the gain magnitude for every two times increase in frequency.

References Cited in the file of this patent

UNITED STATES PATENTS

| | | |
|---|---|---|
| 2,554,905 | Hawkins | May 29, 1951 |
| 2,584,138 | Lichtman | Feb. 5, 1952 |
| 2,586,303 | Clarke | Feb. 19, 1952 |
| 2,662,213 | Vanderlyn | Dec. 8, 1953 |
| 2,686,301 | Bailey | Aug. 10, 1954 |
| 2,728,862 | De Bourgknecht | Dec. 27, 1955 |